(12) United States Patent
Jin

(10) Patent No.: US 8,638,020 B2
(45) Date of Patent: Jan. 28, 2014

(54) STATOR STRUCTURE

(75) Inventor: Jianwei Jin, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 85 days.

(21) Appl. No.: 13/403,959

(22) Filed: Feb. 23, 2012

(65) Prior Publication Data

US 2012/0248900 A1   Oct. 4, 2012

(30) Foreign Application Priority Data

Apr. 1, 2011   (CN) .................. 2011 2 0094096 U

(51) Int. Cl.
  *H02K 1/00*   (2006.01)
(52) U.S. Cl.
  USPC .......................................... 310/194; 310/214
(58) Field of Classification Search
  USPC ........... 310/214, 194, 215, 216.007, 216.008, 310/216.105, 216.115
  See application file for complete search history.

(56) References Cited

U.S. PATENT DOCUMENTS

| | | | |
|---|---|---|---|
| 7,291,955 B2 * | 11/2007 | Otsuji | 310/194 |
| 7,663,287 B2 * | 2/2010 | Haga et al. | 310/260 |
| 8,314,528 B2 * | 11/2012 | Shinohara | 310/194 |
| 2010/0109470 A1 * | 5/2010 | Lyle | 310/215 |

* cited by examiner

*Primary Examiner* — Nguyen N Hanh
(74) *Attorney, Agent, or Firm* — Matthias Scholl P.C.; Matthias Scholl

(57) ABSTRACT

A stator structure, including strip shaped stator cores and end insulators. The end insulators are injection molded with the strip shaped stator cores, as a whole. A wire duct is arranged on top of a yoke of each strip shaped stator core and at the bottom of each end insulator. Two ends inside the wire duct are projected with bosses. Coil windings wind around the bosses and pass through the wire duct. The stator structure is simple and easy to mass produce. It can make full use of the slot filling ratio of the strip shaped stator. The invention solves the puncture problem.

3 Claims, 7 Drawing Sheets

STATOR STRUCTURE

CORRESPONDENCE ADDRESS

Inquiries from the public to applicants or assignees concerning this document Should be directed to: MATTHIAS SCHOLL P.C., ATTN.: DR. MATTHIAS SCHOLL, ESQ., 14771 MEMORIAL DRIVE, SUITE 1319, Houston, Tx. 77079

CROSS-REFERENCE TO RELATED APPLICATIONS

Pursuant to 35 U.S.C. §119 and the Paris Convention Treaty, this application claims the benefit of Chinese Patent Application No. 201120094096.4 filed Apr. 1, 2011, the contents of which are incorporated herein by reference.

BACKGROUND OF THE INVENTION

1. Field of the Invention

The invention relates to a strip shaped injection-molded stator structure.

2. Description of the Related Art

When a conventional motor stator core is connected with its end insulator, the end insulator is generally injection molded separately and then mounted onto the stator core or the end insulators is injection molded with the stator core as a whole. Such a structure is complicated and difficult to be made; moreover, as non-insulators of the stator core cannot be completely isolated with the stator winding, thus the stator has a risk of being punctured.

SUMMARY OF THE INVENTION

In view of the above-described problems, it is one objective of the invention to provide a stator structure that is simple and easily made, and can make full use of the slot filling ratio of the strip shaped stator and solve the puncture problem.

To achieve the above objective, in accordance with one embodiment of the invention, there provided is a stator structure, comprising strip shaped stator cores and end insulators, wherein the end insulators are injection molded with the strip shaped stator cores as a whole; a wire duct is arranged on top of a yoke of each strip shaped stator core and at the bottom of each end insulator, two ends inside the wire duct are projected with bosses, and coil windings wind around the bosses and pass through the wire duct.

In a class of this embodiment, a T-shaped column is projected at the top outer side of a first end insulator, a clip is projected at the top outer side of a second end insulator which is spaced with a plurality of wire holding duct from the first end insulator, a locating column is projected at the top outer side of an end insulator between the T-shaped column and the clip, one side of a control panel is clamped in the T-shaped column and the other side is mounted on the clip.

In a class of this embodiment, the clip comprises two elastic hooks with back against each other, a gap is arranged between the two elastic hooks, a recess is provided between the two elastic hooks and a corresponding end insulator, and the control panel is embedded in the clip and clamped in the recess.

In a class of this embodiment, on top of a connection part between the yoke of each strip shaped stator core and a tooth segment of the strip shaped stator core, an end surface and two side surfaces of a winding segment of each end insulator are joined by an arc surface.

Advantages of the invention are summarized below:

1) The stator structure comprises strip shaped stator cores and end insulators, in which the end insulators are injection molded with the strip shaped stator cores as a whole. A wire duct is arranged on top of a yoke of each strip shaped stator core and at the bottom of each end insulator, two ends inside the wire duct are projected with bosses, and coil windings wind around the bosses and pass through the wire duct. Such a structure makes full use of the slot filling ratio of the strip shaped stator and solves the puncture problem;

2) A T-shaped column is projected at the top outer side of a first end insulator, a clip is projected at the top outer side of a second end insulator which is spaced with a plurality of wire holding duct from the first end insulator, a locating column is projected at the top outer side of an end insulator between the T-shaped column and the clip, one side of a control panel is clamped in the T-shaped column and the other side is mounted on the clip. Thus, the control panel can be easily assembled and operated and is reliable and disassembly friendly, and can be positioned in the perpendicular and circumferential directions by means of two clamp slots and two hooked columns; and 3) On top of a connection part between the yoke of each strip shaped stator core and a tooth segment of the strip shaped stator core, an end surface and two side surfaces of a winding segment of each end insulator are joined by an arc surface. Such a structure allows the winding coil to be tightly against the end cover of the winding segment. The design is reasonable and the structure is compact.

DETAILED DESCRIPTION OF THE EMBODIMENTS

Figure 1:
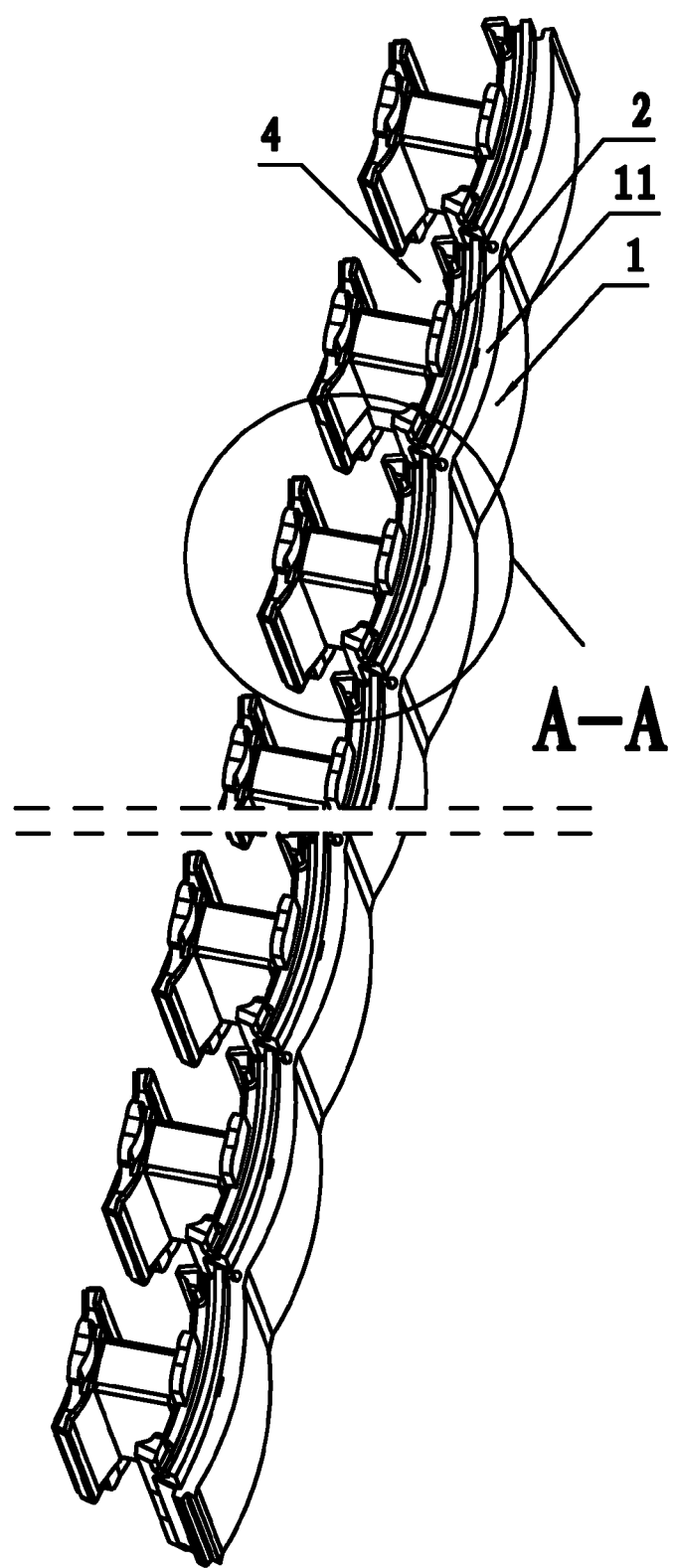
FIG. 1 is a three-dimensional diagram of a stator structure in accordance with one embodiment of the invention.
Figure 2:
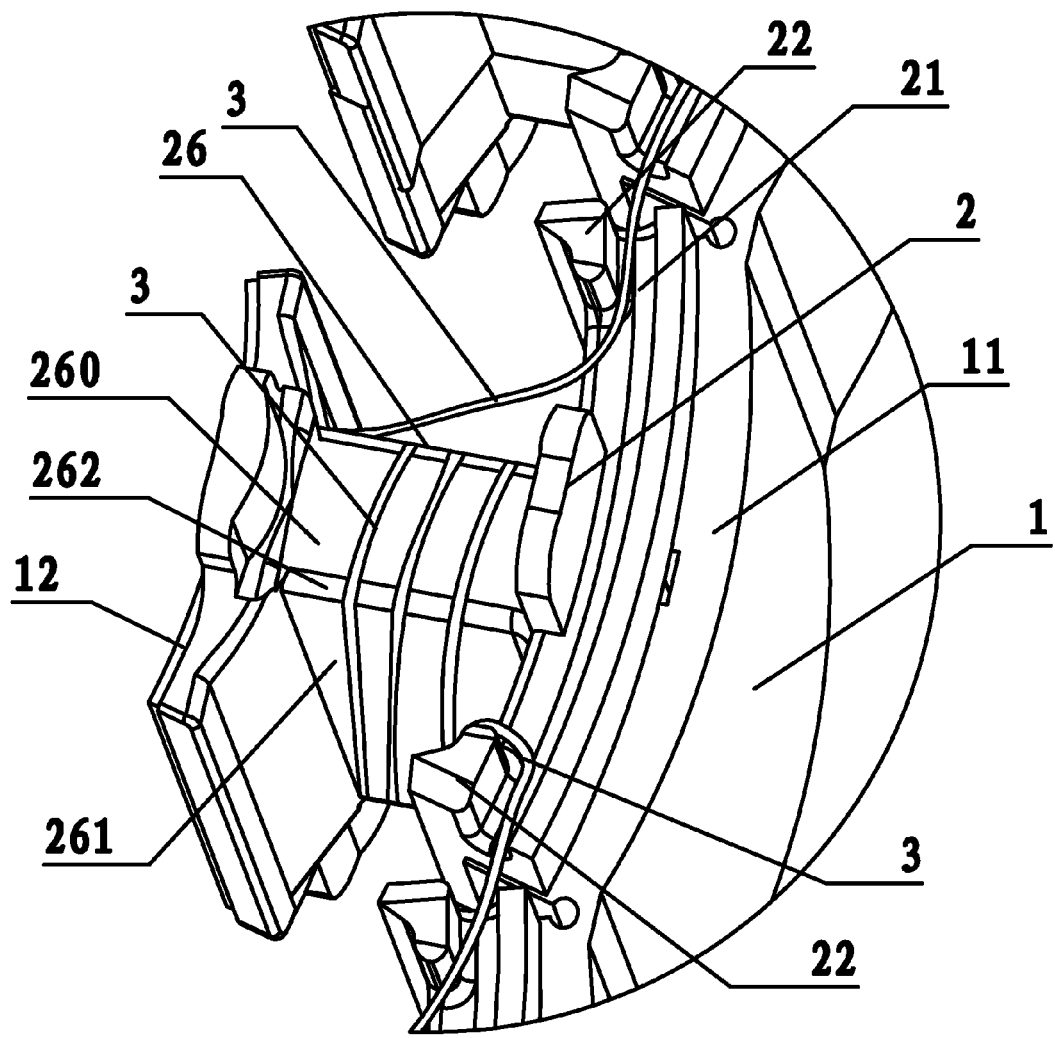
FIG. 2 is a partial enlarged view taken from A-A line of FIG. 1.
Figure 3:
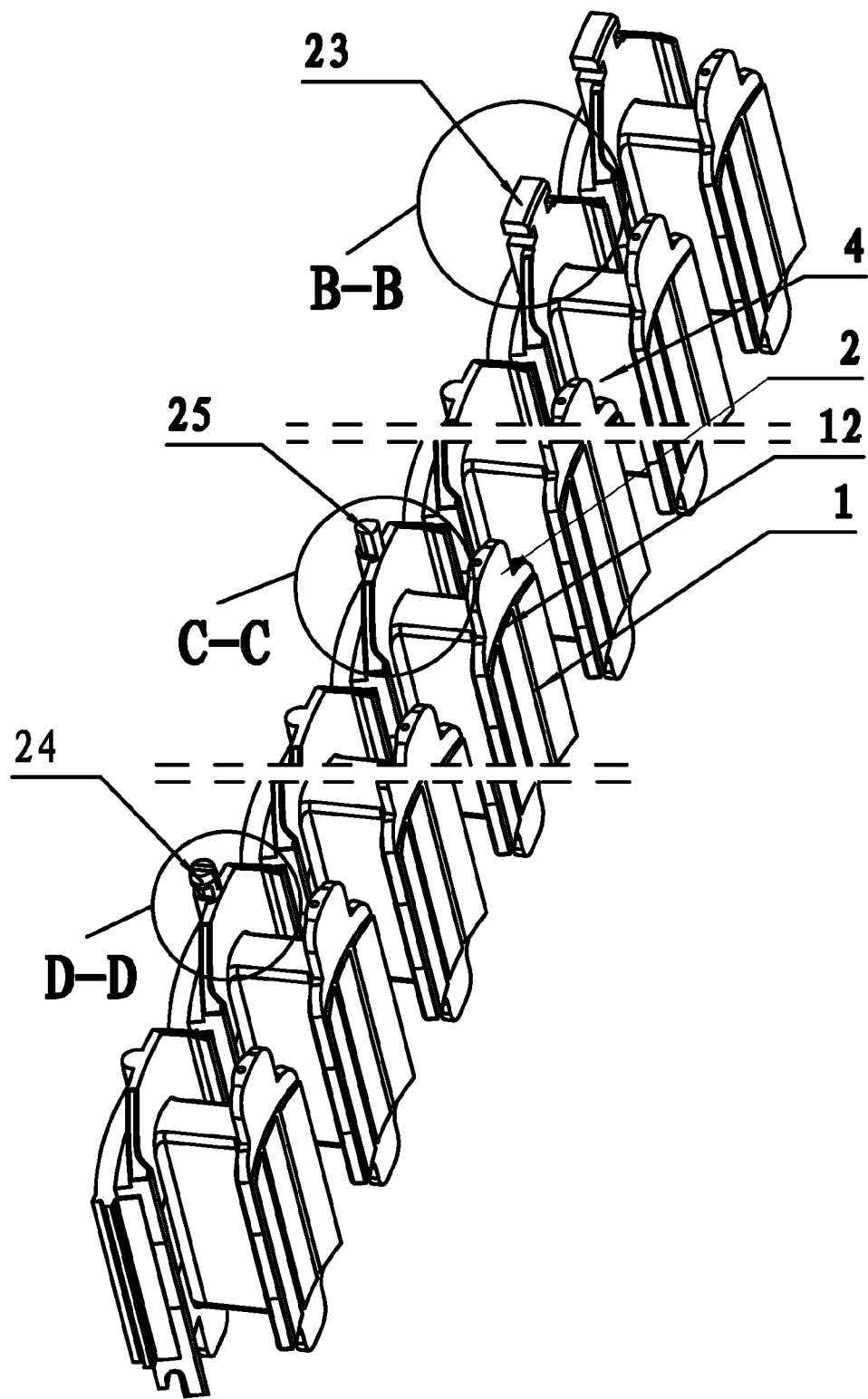
FIG. 3 is another three-dimensional diagram of a stator structure from another perspective in accordance with one embodiment of the invention.
Figure 4:
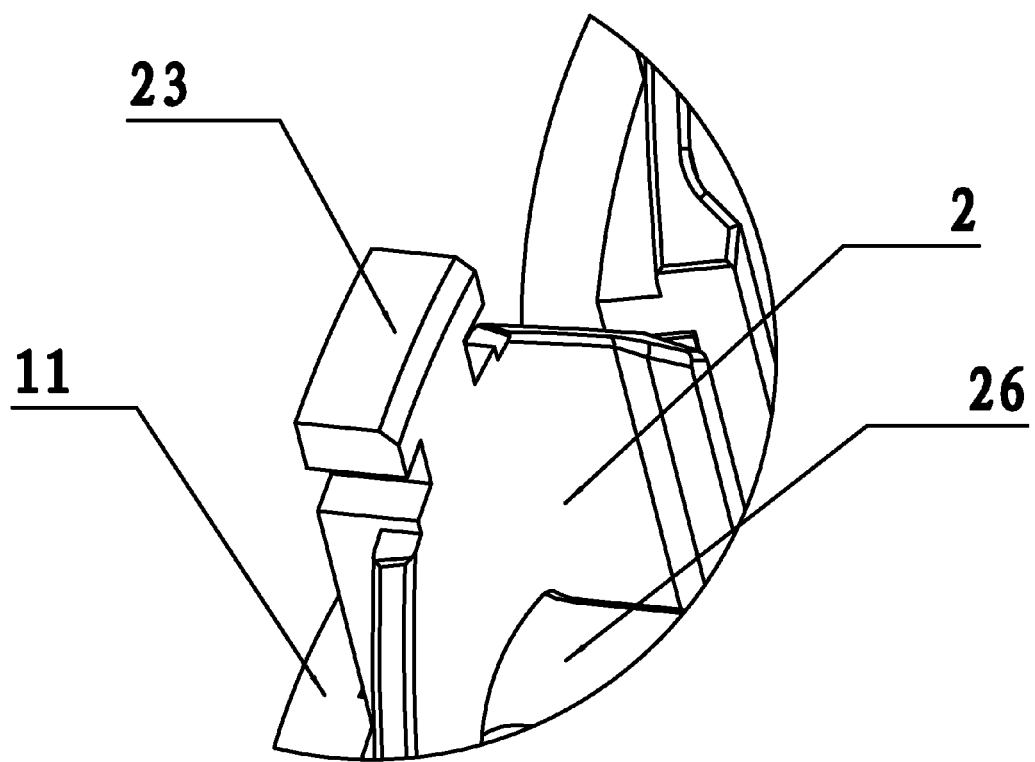
FIG. 4 is a partial enlarged view taken from B-B line of FIG. 3.
Figure 5:
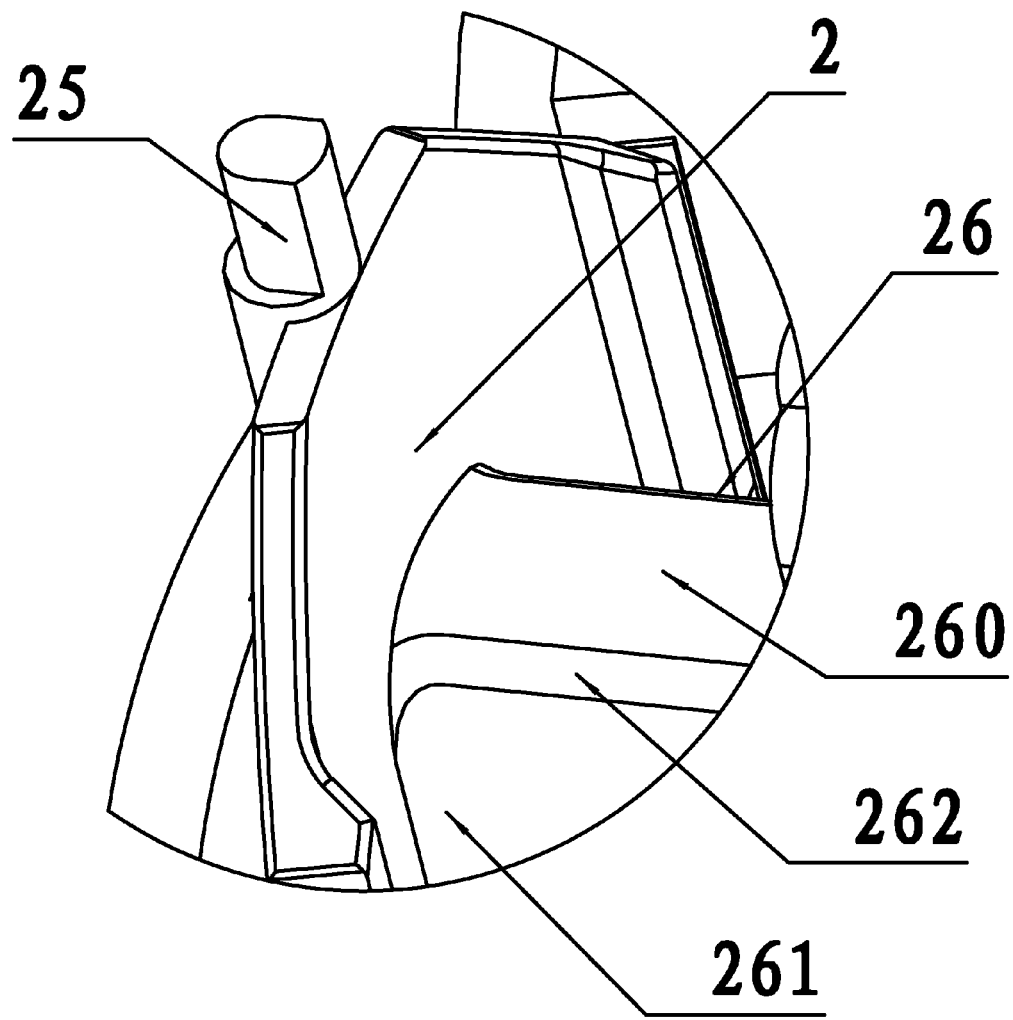
FIG. 5 is a partial enlarged view taken from C-C line of FIG. 3.
Figure 6:
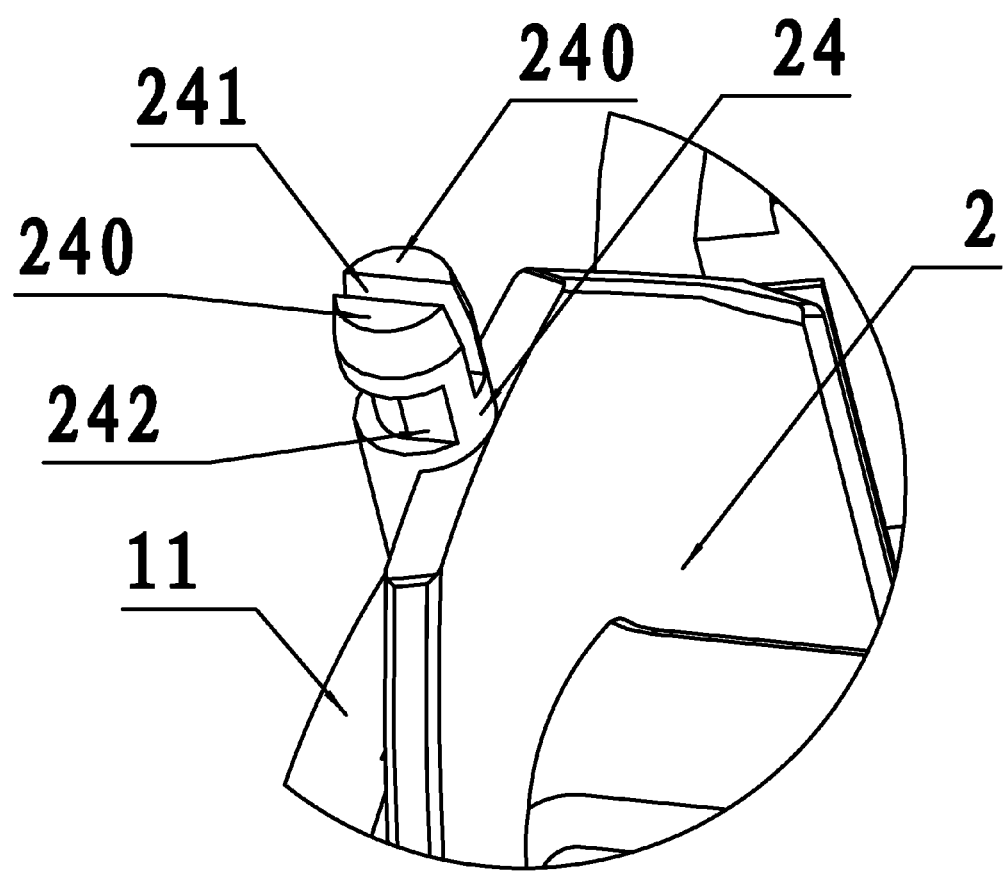
FIG. 6 is a partial enlarged view taken from D-D line of FIG. 3.
Figure 7:
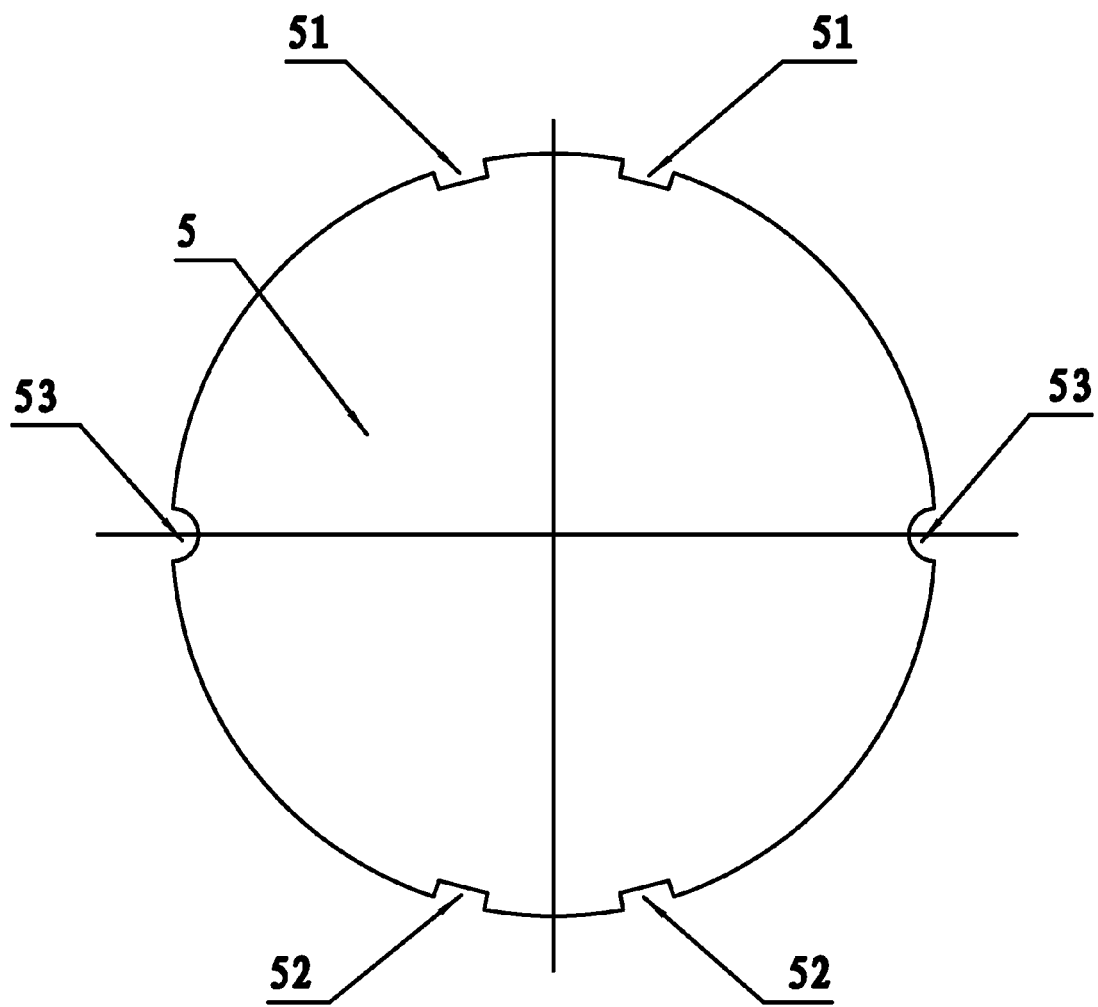
FIG. 7 is a structural representation of a control panel of a stator structure in accordance with one embodiment the invention.

As shown in FIGS. 1-7, a stator structure, in accordance with the invention, comprises strip shaped stator cores 1 and end insulators 2. The end insulators 2 are injection molded with the strip shaped stator cores 1 as a whole. A wire duct 21 is arranged on top of a yoke 11 of each strip shaped stator core 1 and at the bottom of each end insulator 2. Two ends inside the wire duct 21 are projected with bosses 22, and coil windings 3 wind around the bosses 22 and pass through the wire duct 21. A T-shaped column 23 is projected at the top outer side of a first end insulator, a clip 24 is projected at the top outer side of a second end insulator which is spaced with a plurality of wire holding duct 4 from the first end insulator. A locating column 25 is projected at the top outer side of an end insulator between the T-shaped column 23 and the clip 24. A first slot 51 at one side of a control panel 5 is clamped in the T-shaped column 23 and a second slot 52 on the other side is mounted on the clip 24. The locating column 25 is clamped in arc grooves 53 that are at two sides of the control panel 5. The clip 24 comprises two elastic hooks 240 with back against each other, and a gap 241 is arranged between the two elastic hooks 240. A recess 242 is provided between the two elastic hooks 240 and a corresponding end insulator 2. The slots 52 on the control panel 5 are embedded in the clip 24 and clamped in the recess 242. On top of a connection part between the yoke 11 of each strip shaped stator core 1 and a tooth segment 12 of the strip shaped stator core, an end surface 260 and two side surfaces 261 of a winding segment 26 of each end insulator 2 are joined by an arc surface 262.

A strip shaped injection-molded stator structure, in accordance with the invention, comprises strip shaped stator cores 1 and end insulators 2, in which the end insulators 2 are injection molded with the strip shaped stator cores 1 as a whole. A wire duct 21 is arranged on top of a yoke 11 of each strip shaped stator core 1 and at the bottom of each end insulator 2, the two ends inside the wire duct 21 are projected with bosses 22, and coil windings 3 wind around the bosses 22 and pass through the wire duct 21. Such a structure makes full use of the slot filling ratio of the strip shaped stator and solves the puncture problem. A T-shaped column 23 is projected at the top outer side of a first end insulator, a clip 24 is projected at the top outer side of a second end insulator which is spaced with a plurality of wire holding duct 4 from the first end insulator, a locating column 25 is projected at the top outer side of an each end insulator between the T-shaped column 23 and the clip 24. When a circular stator is formed, the T-shaped column 23 and the clip 24 are symmetric to each other. A first slot 51 at one side of a control panel 5 is clamped in the T-shaped column 23 and a second 52 on the other side is mounted on the clip 24, and the locating column 25 is clamped in arc grooves 53 that are at two sides of the control panel 5. The control panel 5 can be easily assembled and operated and thus is reliable and disassembly friendly. It is used for position limitation in the perpendicular and circumferential directions by means of two clamp slots and two hooked columns.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A stator structure, comprising:
 a) strip shaped stator cores; and
 b) end insulators;
wherein:
 the end insulators are injection molded with the strip shaped stator cores as a whole:
 a wire duct is arranged at the bottom of a yoke of each strip shaped stator core and at the top of each end insulator;
 two ends inside the wire duct are projected with bosses;
 coil windings wind around the bosses and pass through the wire duct;
 a T-shaped column is projected at the top outer side of a first end insulator;
 a clip is projected at the top outer side of a second end insulator which is spaced with a plurality of wire holding duct from the first end insulator;
 a locating column is projected at the top outer side of an end insulator between the T-shaped column and the clip; and
 one side of a control panel is clamped in the T-shaped column and the other side is mounted on the clip.

2. The stator structure of claim 1, wherein
 the clip comprises two elastic hooks with back against each other;
 a gap is arranged between the two elastic hooks;
 a recess is provided between the two elastic hooks and a corresponding end insulator; and
 the control panel is embedded in the clip and clamped in the recess.

3. The stator structure of claim 1, wherein on top of a connection part between the yoke of each strip shaped stator core and a tooth segment of the strip shaped stator core, an end surface and two side surfaces of a winding segment of each end insulator are joined by an arc surface.

* * * * *